(12) United States Patent
Chen et al.

(10) Patent No.: US 8,581,966 B2
(45) Date of Patent: Nov. 12, 2013

(54) TRACKING-ENHANCED THREE-DIMENSIONAL DISPLAY METHOD AND SYSTEM

(75) Inventors: Liang Chen, Shenzhen (CN); Lei Song, Shenzhen (CN)

(73) Assignee: SuperD Co. Ltd., Shenzhen (CN)

( * ) Notice: Subject to any disclaimer, the term of this patent is extended or adjusted under 35 U.S.C. 154(b) by 401 days.

(21) Appl. No.: 12/963,622

(22) Filed: Dec. 8, 2010

(65) Prior Publication Data
US 2012/0120203 A1  May 17, 2012

(30) Foreign Application Priority Data
Nov. 16, 2010 (CN) .......................... 2010 1 05465276

(51) Int. Cl.
*H04N 13/04* (2006.01)

(52) U.S. Cl.
USPC .......... 348/51; 348/42; 348/48; 348/E13.026; 348/E13.074; 382/103

(58) Field of Classification Search
None
See application file for complete search history.

(56) References Cited

U.S. PATENT DOCUMENTS

| | | | | |
|---|---|---|---|---|
| 6,008,484 A * | 12/1999 | Woodgate et al. | ......... | 250/201.1 |
| 6,377,295 B1 * | 4/2002 | Woodgate et al. | ............. | 348/59 |
| 6,533,420 B1 * | 3/2003 | Eichenlaub | ....................... | 353/7 |
| 2005/0083400 A1 * | 4/2005 | Hirayama et al. | ......... | 348/14.07 |
| 2006/0170674 A1 * | 8/2006 | Tsubaki et al. | ............... | 345/419 |
| 2007/0171276 A1 * | 7/2007 | Kim et al. | ........................ | 348/51 |
| 2010/0053310 A1 * | 3/2010 | Maxson et al. | ................ | 348/51 |
| 2010/0157026 A1 * | 6/2010 | Reichelt | ......................... | 348/51 |
| 2010/0225743 A1 * | 9/2010 | Florencio et al. | .............. | 348/46 |
| 2011/0096071 A1 * | 4/2011 | Okamoto et al. | ............. | 345/419 |
| 2011/0285700 A1 * | 11/2011 | Kim et al. | ..................... | 345/419 |
| 2012/0038635 A1 * | 2/2012 | Stamate et al. | ............... | 345/419 |
| 2012/0044330 A1 * | 2/2012 | Watanabe | ....................... | 348/54 |
| 2012/0062556 A1 * | 3/2012 | Yamamoto et al. | ........... | 345/419 |
| 2012/0200676 A1 * | 8/2012 | Huitema et al. | ................ | 348/51 |
| 2013/0044109 A1 * | 2/2013 | Hong | ........................... | 345/419 |

* cited by examiner

*Primary Examiner* — Christopher S Kelley
*Assistant Examiner* — Kaitlin A Retallick
(74) *Attorney, Agent, or Firm* — Anova Law Group, PLLC

(57) ABSTRACT

A three-dimensional display method is provided in the present disclosure. The three-dimensional display method includes obtaining position information of an observer; and adjusting displaying content of a stereoscopic image according to the position information. A tracking three-dimensional display unit and an image processing device are also provided in the present disclosure. In the present disclosure, three-dimensional displaying contents may be adjusted according to the position information of the observer to introduce movement parallax, so as to achieve mutual effect between the observer and displaying contents, and enhance the sense of reality of three-dimensional displaying.

14 Claims, 10 Drawing Sheets

TRACKING-ENHANCED THREE-DIMENSIONAL DISPLAY METHOD AND SYSTEM

TECHNICAL FIELD

The present disclosure generally relates to three-dimensional display techniques, and more particularly relates to a three-dimensional display method, a tracking three-dimensional display unit and an image processing device thereof.

BACKGROUND

Recently, three-dimensional display techniques are rapidly developed, and becomes a hot research spot. The three-dimensional display technique is importantly used in the fields of medical treatment, advertisement, military affairs, exhibit, recreation, etc. For the original three-dimensional display technique, a stereoscopic image is mainly observed via wearing special spectacles. However, currently popular products are mainly naked-eye three-dimensional display units based on binocular parallax. The main design of the naked eye three-dimensional display unit is to set a grating before a display panel, wherein the grating respectively provides at least two parallax images displayed by a display panel to left eye and right eye of an observer.

Presently, most naked-eye three-dimensional display units can only display the contents in the form of three dimensions. However, there is no mutual effect between the observer and the displaying contents, and the effect in the real living is not completely exhibited.

Referring to FIGS. 1A and 1B, when a position of an observer 103 changes, a moving direction and speed of an ambient object observed may generate difference, and a sheltering state may also change. This difference and change is referred to as movement parallax. Firstly, referring to FIG. 1A, a scene observed by the observer 103 is an image of an object 101 partly sheltered by an object 102. When the observer 103 moves to a position shown in FIG. 1B, an image that no sheltering relation occurs between the object 102 and the object 101 is observed.

The movement parallax may cause the observer 103 to have a certain depth feeling. With the movement of the observer 103, a feeling of spatial arrangement between objects may be enhanced due to changing of relative movement and sheltering relation between the objects. For example, when only observing from FIG. 1A, the observer 103 may not feel that there is a longer distance between the object 101 and the object 102. However, when the observer 103 moves to the position shown in FIG. 1B, a distance between the two objects is reflected.

BRIEF SUMMARY OF THE PRESENT DISCLOSURE

According to an embodiment of the present disclosure, a three-dimensional display method includes: obtaining position information of an observer; and adjusting displaying content of a stereoscopic image according to the position information.

According to another embodiment of the present disclosure, a tracking three-dimensional display unit includes: a display panel; an image processing device for providing a stereoscopic image to the display panel; and a tracking device for obtaining an image sequence of an observer. The image processing device determines position information of the observer according to the image sequence, and adjusts displaying content of the stereoscopic image according to the position information.

According to another embodiment of the present disclosure, an image processing device includes: an receive device for receiving an image sequence of an observer; a memory for storing tracking logic and stereoscopic image synthesizing logic; and a processor for running the tracking logic and determining position information of the observer according to the image sequence, and running the stereoscopic image synthesizing logic so as to synthesize a stereoscopic image according to the position information.

BRIEF DESCRIPTION OF THE DRAWINGS

The components in the drawing are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF EMBODIMENTS

Reference will now be made to the drawings to described exemplary embodiments in detail.

Figure 1A:
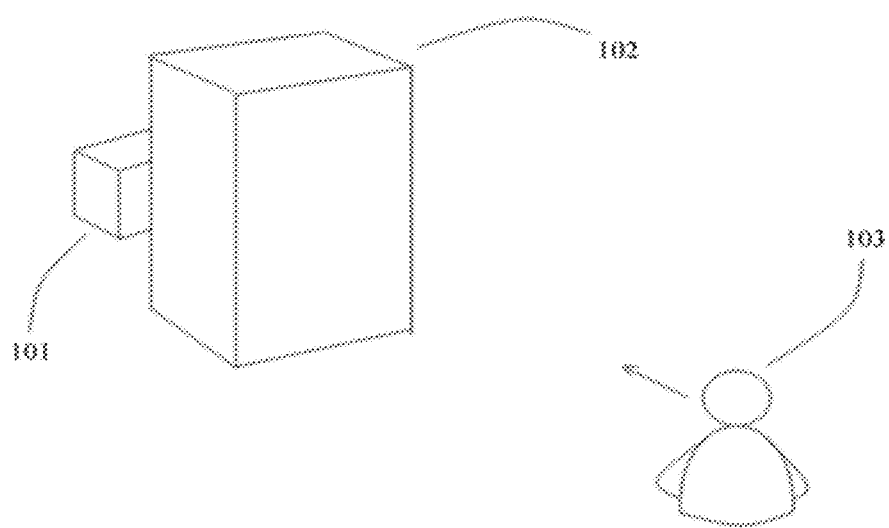
FIGS. 1A and 1B are schematic views for explaining movement parallax.
Figure 1B:
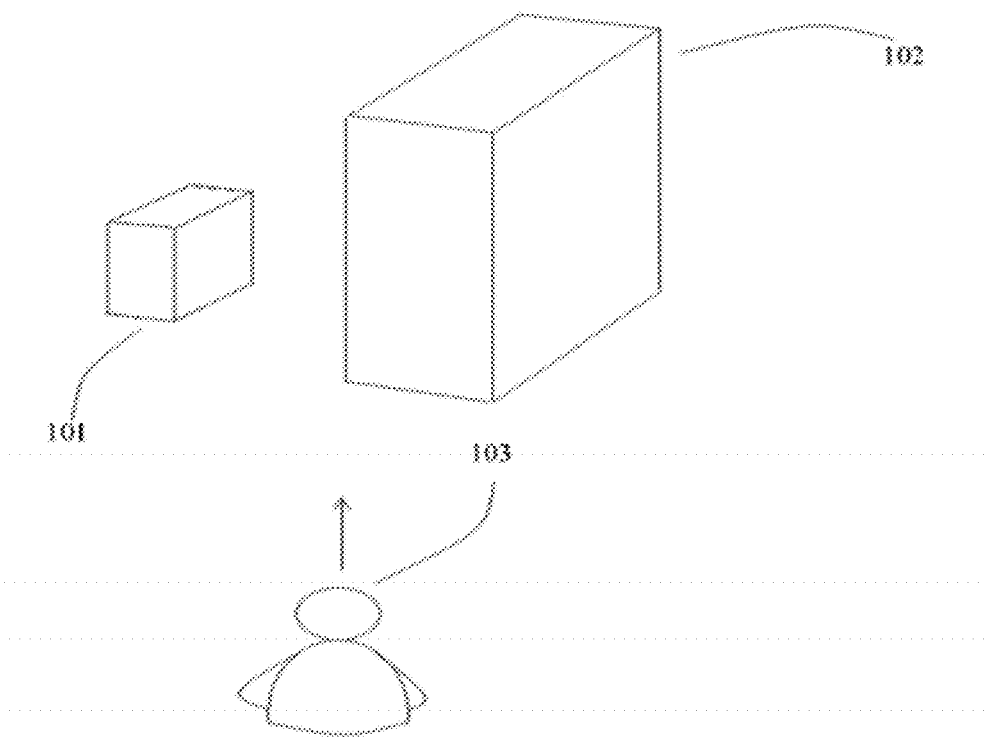
Figure 2:
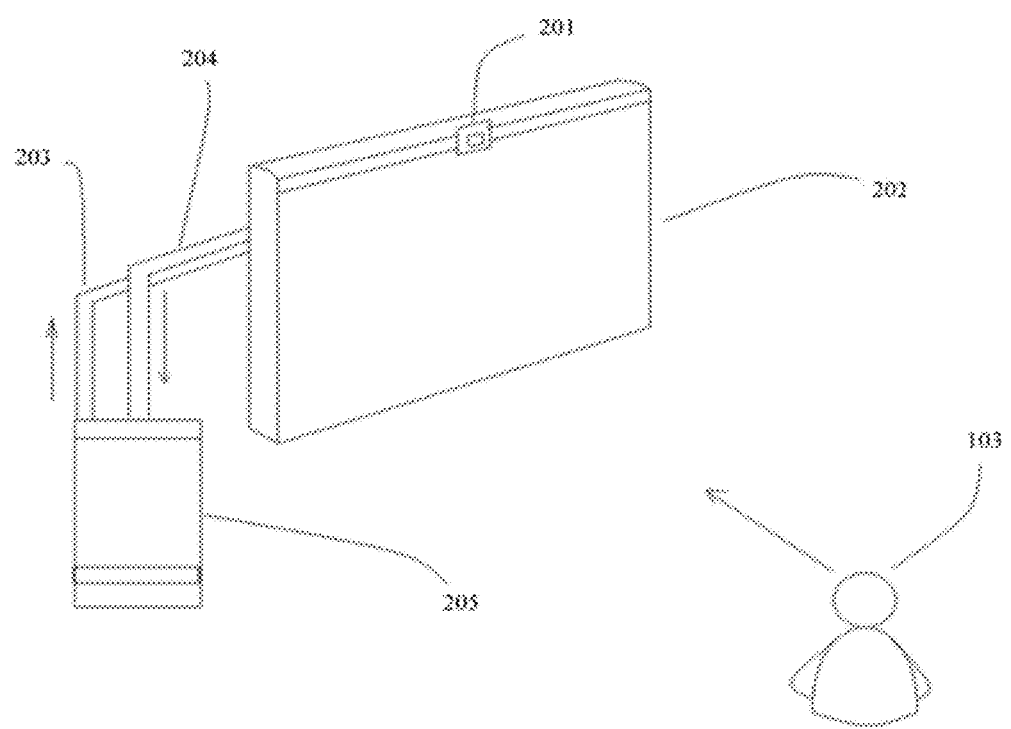
FIG. 2 is a structural schematic view of a tracking three-dimensional display unit according to a preferred embodiment of the present disclosure.

Referring to FIG. 2, a structural schematic view of a tracking three-dimensional display unit according to a preferred embodiment of the present disclosure is shown. The tracking three-dimensional display unit may comprise a display panel 202 for displaying images, an image processing device 205 for providing a stereoscopic image to the display panel 202, and a tracking device 201. In the present embodiment, the tracking device 201 may be used for obtaining an image sequence of the observer, and transmitting the image sequence obtained to the image processing device 205 through a signal line 204. The image processing device 205 may determine position information of the observer according to the image sequence, adjust displaying contents of a stereoscopic image according to the position information, and transmit the stereoscopic image adjusted to the display panel 202 through a signal line 203 for displaying.

In an embodiment of the present disclosure, the image processing device 205 may adjust the arrangement manner of pixels of the stereoscopic image according to the position information of the observer, so as to generate a stereoscopic image adapted to be observed at a new position.

Figure 3:
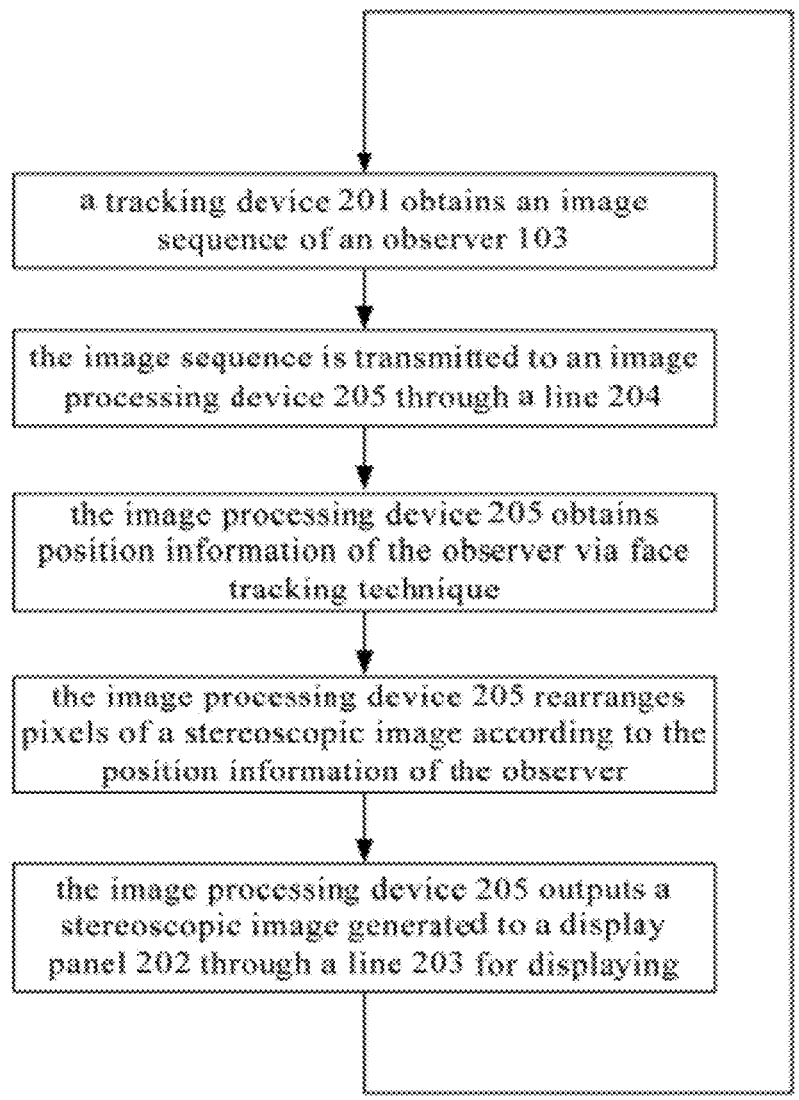
FIG. 3 is a flow chart of a three-dimensional display method according to the tracking three-dimensional display unit of FIG. 2.

Referring to FIG. 3, a flow chart of a three-dimensional display method according to the tracking three-dimensional display unit of FIG. 2 is shown. Firstly, the tracking device 201 may obtain an image sequence of the observer 103 and transmit the image sequence to the image processing device 205 through the signal line 204. The image processing device 205 may process the image sequence obtained from the tracking device 201 via face tracking and recognizing technique, so that position information of the observer 103 is obtained. When a position of the observer 103 changes, the image processing device 205 may adjust the arrangement manner of pixels of the stereoscopic image according to the position information of the observer 103 (i.e., to rearrange pixels of the stereoscopic image), so as to generate a stereoscopic image adapted to be observed at a new position. The image processing device 205 may output the stereoscopic image to the display panel 202 through the signal line 203 for displaying.

There are several methods for adjusting the arrangement manner of pixels of the stereoscopic image according to the position information of the observer 103. For instance, when the observer 103 moves, pixel contents of the display panel 202 may be adjusted according to the movement distance of the observer 103. In the present embodiment, when the observer 103 moves from a main three-dimensional display zone to a satellite three-dimensional display zone, the displaying content for each pixel may be exchanged between the first image and the second image. In an example of a binocular stereoscopic display, the displaying positions of the first image and second image belonging to a stereo pairs may be exchanged correspondingly. Similarly, the present disclosure may apply to a multi-view stereoscopic display. The term "main three-dimensional display zone" represents a zone, in which the left eye could see the first image and the right eye could see the second image. On the contrary, the term "satellite three-dimensional display zone" represents a zone, in which the left eye could see the second image and the right eye could see the first image, as shown in FIGS. 5A, 5B and 5C.

Figure 5A:
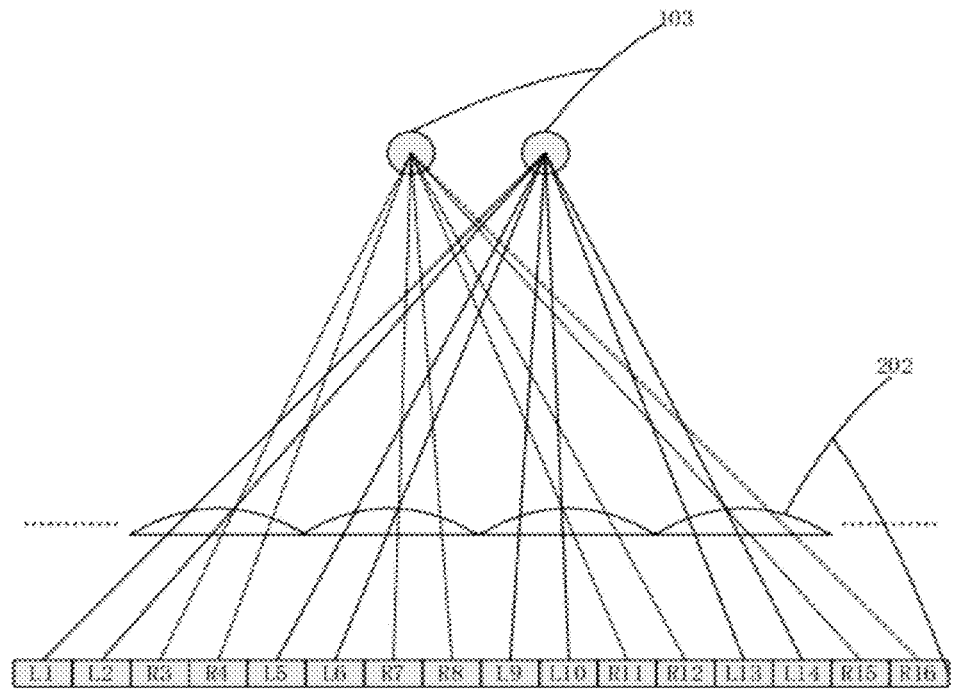
FIGS. 5A, 5B and 5C are schematic views of the three-dimensional display method shown in FIG. 2.
Figure 5B:
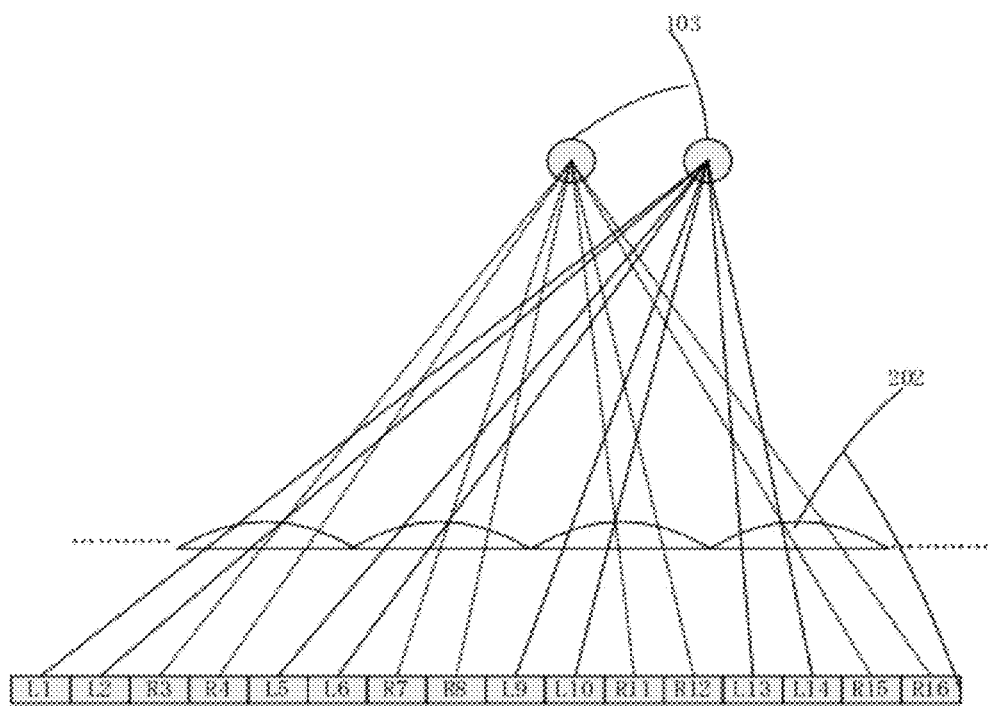
Figure 5C:
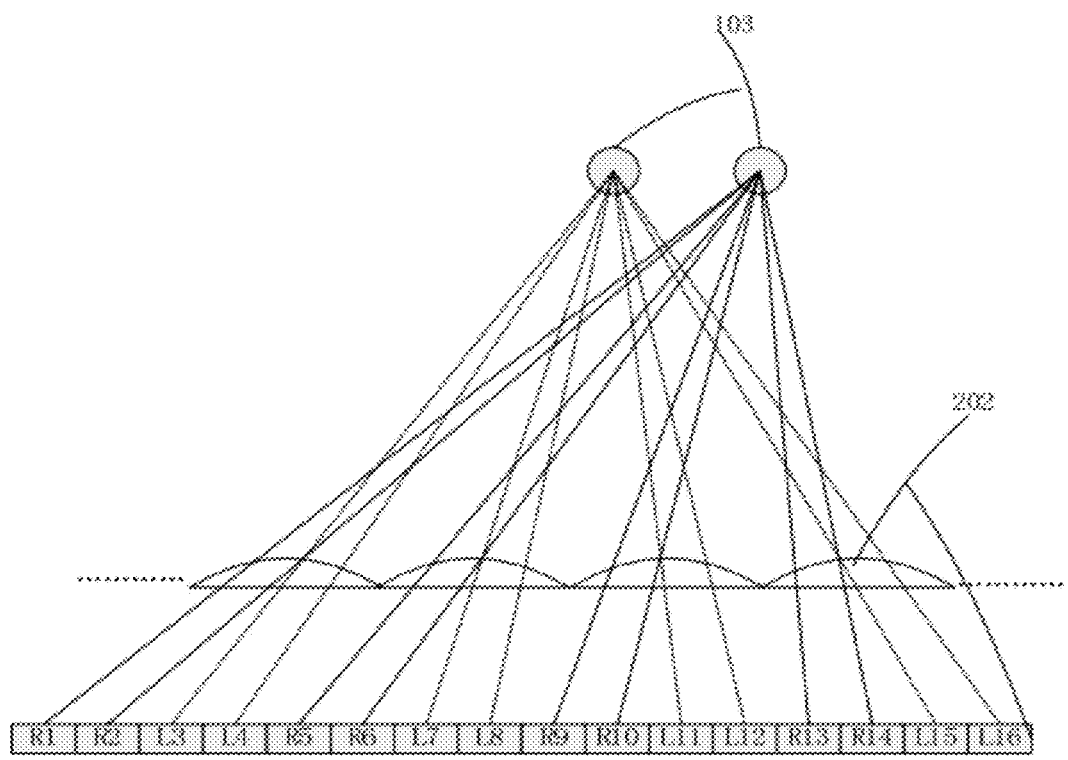

Referring to FIGS. 5A and 5B, schematic views of the three-dimensional display method shown in FIG. 2 are shown. In FIGS. 5A and 5B, each label of Ln, Rn(n=1,2,3,4, 5,6 . . . ) represents a display pixel on nth column of the display panel 202. L1, L2, . . . , L14 are according to the first image (e.g. the left eye's image), and R1, R2, . . . , R14 are according to the second image (e.g. the right eye's image).

When the observer 103 moves rightwards beyond a predetermined distance, from the main three-dimensional display zone as shown in FIG. 5A to the satellite three-dimensional display zone as shown in FIG. 5B, the left eye may see the second image and the right eye may see the first image. So the observer 103 may have an indisposed reaction to the stereoscopic vision or may not feel a real stereoscopic vision. In a present embodiment, the displaying positions of the first image and the second image of the stereoscopic image on the display panel 202 may be exchanged as shown in FIG. 5C. By this adjustment manner, the observer 103 may acquire a stereoscopic image adapted to be observed at a new position. The predetermined distance is determined by the configuration of the three-dimensional display. This adjustment process is achieved via determining the position of the observer 103 by the image processing device 205.

Notably, the tracking three-dimensional display unit of the present disclosure may perform the above steps repeatedly, so as to achieve a continuous tracking for the observer 103 and a continuous adjustment for the stereoscopic image. The tracking device 201 may collect the image sequence of the observer 103 via a video camera. The video camera should be able to acquire a smooth image sequence, because the position information of the observer 103 determined by the image processing device 205 via computing will be more accurate and continuous if a continuity of the image sequence acquired is better. Accordingly, the stereoscopic image generated by the image processing device 205 will be smooth, so that the observer 103 may not have an indisposed reaction to stereoscopic vision. In order to acquire a smooth image sequence, a frame speed of the video camera utilized by the tracking device 201 preferably is not less than 30 fps.

The face tracking technique mentioned above needs not the observer 103 to wear an assistant device (e.g., special spectacles). Instead, an image position of the observer 103 may be found via face matching or head feature to an image from the video camera, and may be transformed into a space position according to inner parameters of the video camera. In the present embodiment, the video camera of the tracking device 201 may be located at the axial position of the display panel 202, so that the image position of the observer 103 is easily to be transformed into the space position.

Figure 4:
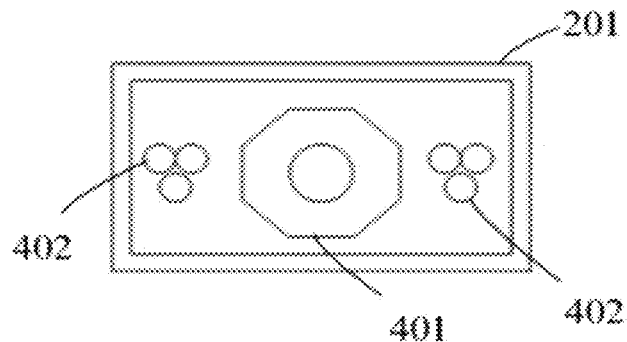
FIG. 4 is a structural schematic view of a tracking device according to a preferred embodiment of the present disclosure.

Referring to FIG. 4, a structural schematic view of a tracking device according to a preferred embodiment of the present disclosure is shown. The tracking device 201 may comprise a video camera 401 and an assistant lighting device 402. In the present embodiment, the assistant lighting device 402 may be a near infrared lamp. In practice, one or more near infrared lamp with different structure may be adopted. In addition, it is understood that the power will be bigger if more near infrared lamps are used. Accordingly, the power consumption will be bigger and requirement to heat dissipation will be higher. Thus, in order to achieve a purpose of economizing on energy, the tracking device 201 may further adopt an ambient brightness detecting device (not shown). In the present embodiment, the ambient brightness detecting device may be a photosensitive resistance. When the ambient brightness detecting device detects that an ambient brightness of the tracking device 201 is lower than a predetermined value, the assistant lighting device 402 starts up for providing assistant lighting. Notably, in addition to the near infrared lamp, the assistant lighting device 402 described in the present disclosure may also use other lighting devices known by person skilled in the art. Further, the ambient brightness detecting device herein is not limited to the photosensitive resistance. For example, photosensitive elements known in the art may also be used.

Figure 6:
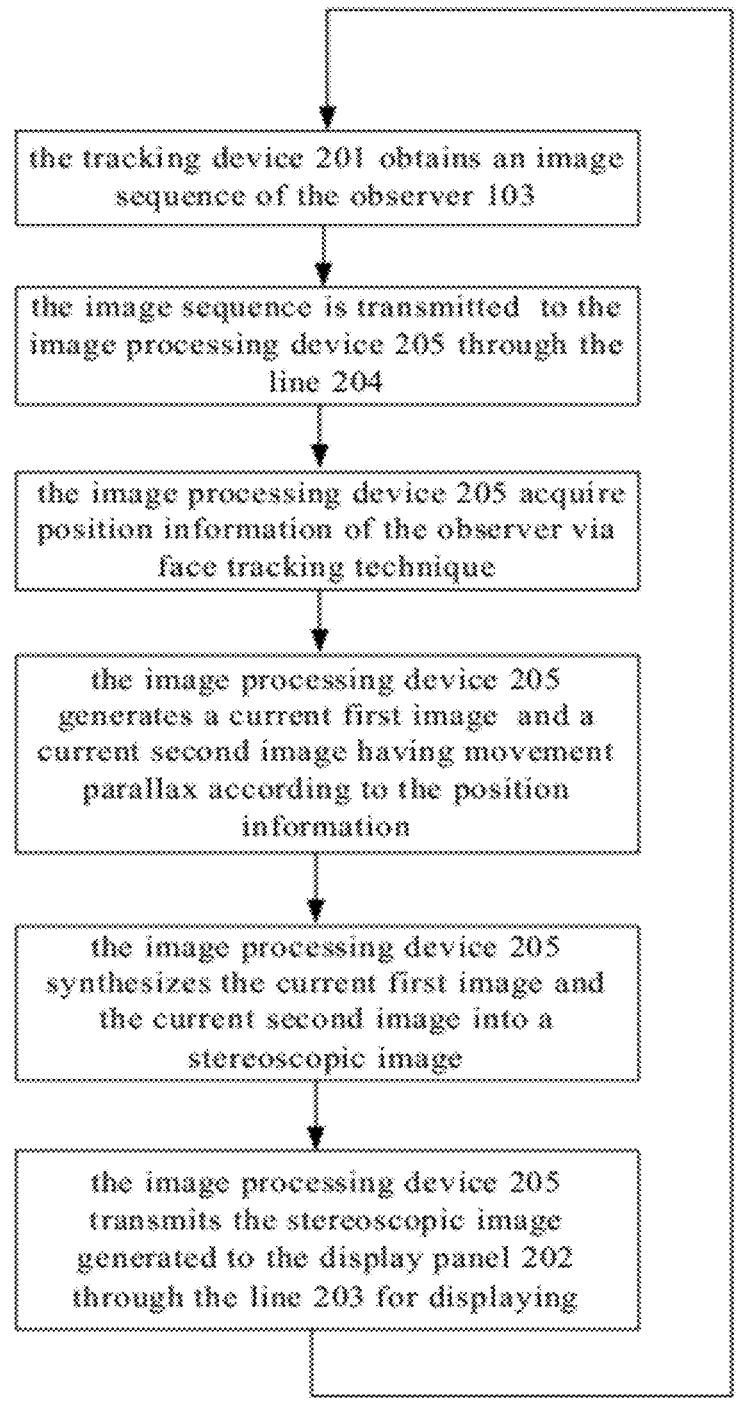
FIG. 6 is a flow chart of a three-dimensional display method according to another preferred embodiment of the present disclosure.

Referring to FIG. 6, a flow chart of a three-dimensional display method according to another preferred embodiment of the present disclosure is shown. Firstly, the tracking device 201 obtains an image sequence of the observer 103, and transmits the image sequence to the image processing device 205 through the signal line 204. The image processing device 205 processes the image sequence obtained from the tracking device 201 via face tracking technique, so as to acquire the position information of the observer 103. When a position of the observer 103 changes, the image processing device 205 generates at least two images having movement parallax compared with foregoing images according to the position information of the observer 103. Specifically, the image processing device 205 generates a current first image having movement parallax compared with foregoing first image and a current second image having movement parallax compared with foregoing second image according to the position information of the observer 103. The image processing device 205 synthesizes the current first image and the current second image into a stereoscopic image, and transmits it to the display panel 202 through the signal line 203 for displaying, so that the displaying effect of the tracking three-dimensional display unit may have the movement parallax.

Figure 7A:
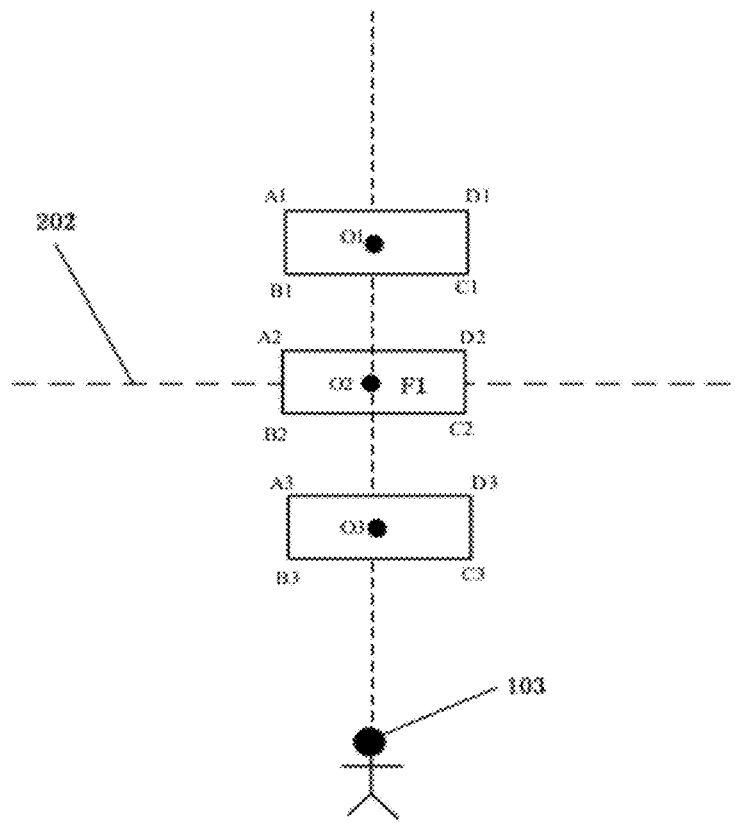
FIGS. 7A-7D are schematic views which introduce movement parallax in different-time eye's images as mentioned in FIG. 6.

Referring to FIGS. 7A-7D, schematic views which introduce movement parallax in different-time eye's images are shown as mentioned in FIG. 6. In the present embodiment, the movement parallax between the foregoing first image and the foregoing second image and the current first image and the second image is mainly introduced based on three-dimensional display focus F1, wherein the three-dimensional display focus F1 means the center of the three-dimensional display area on the display panel 202. Referring to FIG. 7A, the foregoing object spatially presented by the foregoing first image and the second image via the three-dimensional display unit mainly has three position relations with the three-dimensional display focus F1, as following: a first relation is that the foregoing object and the observer 103 locate at two opposite sides of the three-dimensional display focus F1 respectively (i.e., the foregoing object is in rear of the display panel 202; a second relation is that the foregoing object locates at the three-dimensional display focus F1 (i.e., the foregoing object is on the surface of the display panel 202); a third relation is that the foregoing object locates between the three-dimensional display focus F1 and the observer 103 (i.e., the foregoing object is in front of the display panel 202).

In the present embodiment, the current first image and the current second image are generated according to a deflection direction of a line drawn through the observer 103 (for example, eye) and the three-dimensional display focus F1 with respect to a line drawn through eye of the observer 103 and the object center, such that a current object spatially presented by the current first image and the current second image deflects about the three-dimensional display focus F1 with respect to the foregoing object. Specifically, the deflection direction of the current object with respect to the foregoing object is the same with that of the line drawn through the observer 103 and the three-dimensional display focus F1 with respect to the line drawn through the observer 103 and the object center.

Figure 7B:
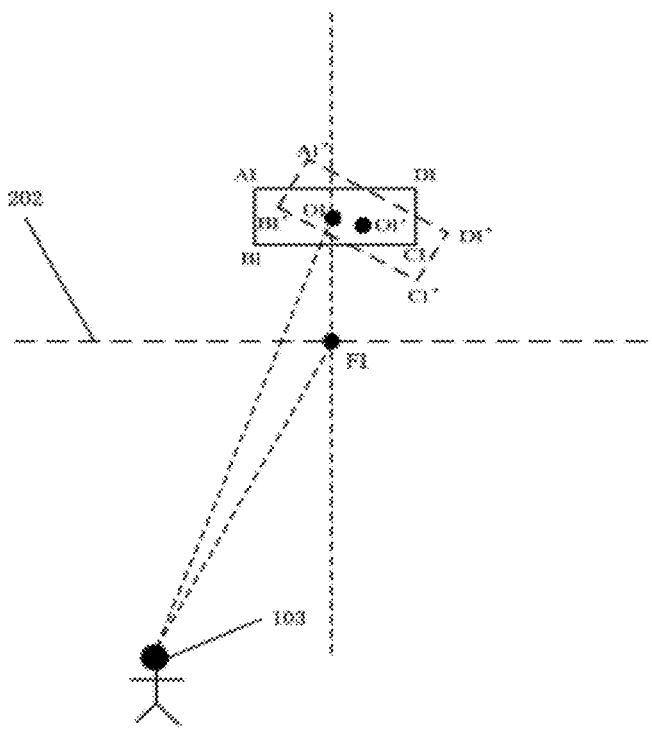

For example, referring to FIGS. 7A and 7B, in the case that the foregoing object center O1 and the observer 103 respectively locates at two opposite sides of the three-dimensional display focus F1, the line drawn through the observer 103 and three-dimensional display focus F1 deflects clockwise with respect to the line drawn through the observer 103 and the object center when the observer 103 moves leftwards. Now, the current object deflects clockwise about the three-dimensional display focus F1 with respect to foregoing object. The position relation between the current object center O1' and four corners A1', B1', C1' and D1' thereof and the foregoing object center O1 and four corners A1, B1, C1 and D1 thereof are specifically shown in FIG. 7B. Similarly, the deflection manner may be applied to the case that the observer 103 moves rightwards.

Figure 7C:
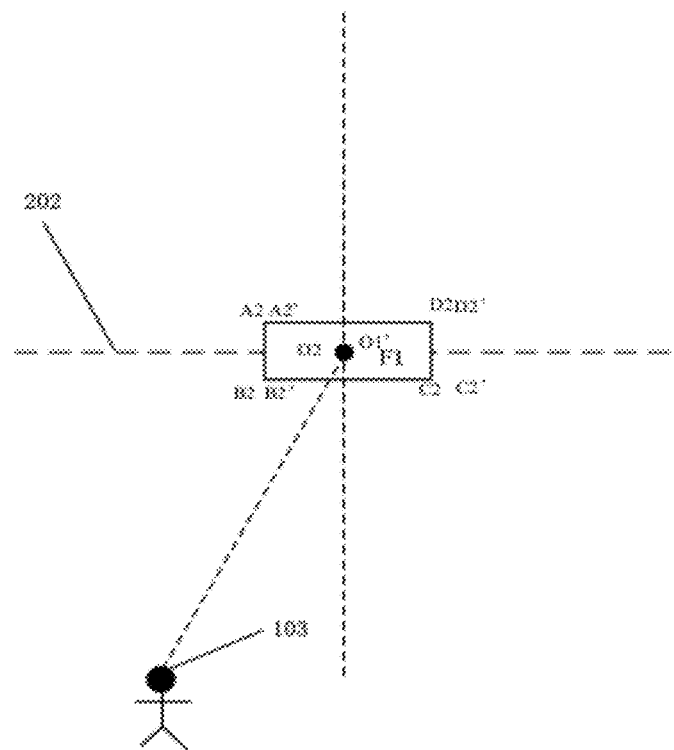

Referring to FIG. 7C, in the case that the foregoing object center O2 coincides with the three-dimensional display focus F1, the line drawn through the observer 103 and the three-dimensional display focus F1 does not deflect with respect to the line drawn through the observer 103 and the object center when the observer 103 moves leftwards. Now, the current object does not rotate with respect to the foregoing object. The position relation between the current object center O2' and four corners A2', B2', C2' and D2' thereof and the foregoing object center O2 and four corners A2, B2, C2 and D2 thereof are specifically shown in FIG. 7C. Similarly, the deflection manner may be applied to the case that the observer 103 moves rightwards.

Figure 7D:
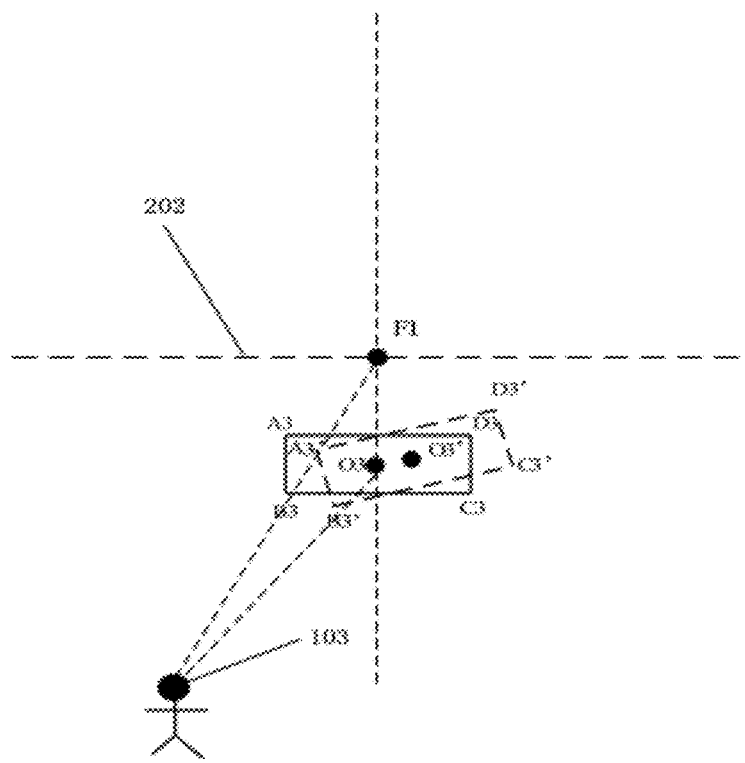

For example, referring to FIG. 7D, in the case that the foregoing object center O3 locates between the three-dimensional display focus F1 and the observer 103, the line drawn through the observer 103 and the three-dimensional display focus F1 deflects anticlockwise with respect to the line drawn through the observer 103 and the object center O3 when the observer 103 moves leftwards. Now, the current object deflects anticlockwise about the three-dimensional display focus F1 with respect to foregoing object. The position relation between the current object center O3' and four corners A3', B3', C3' and D3' thereof and the foregoing object center O3 and four corners A3, B3, C3 and D3 thereof is specifically shown in FIG. 7D. Similarly, the deflection manner may be applied to the case that the observer 103 moves rightwards.

Figure 8A:
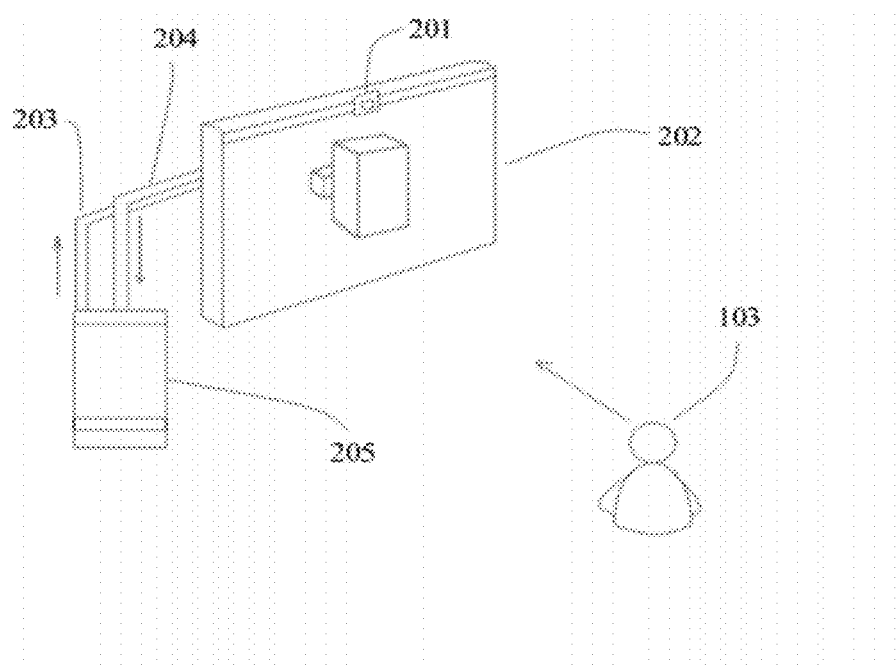
FIGS. 8A and 8B are schematic views of the three-dimensional display method shown in FIG. 6.
Figure 8B:
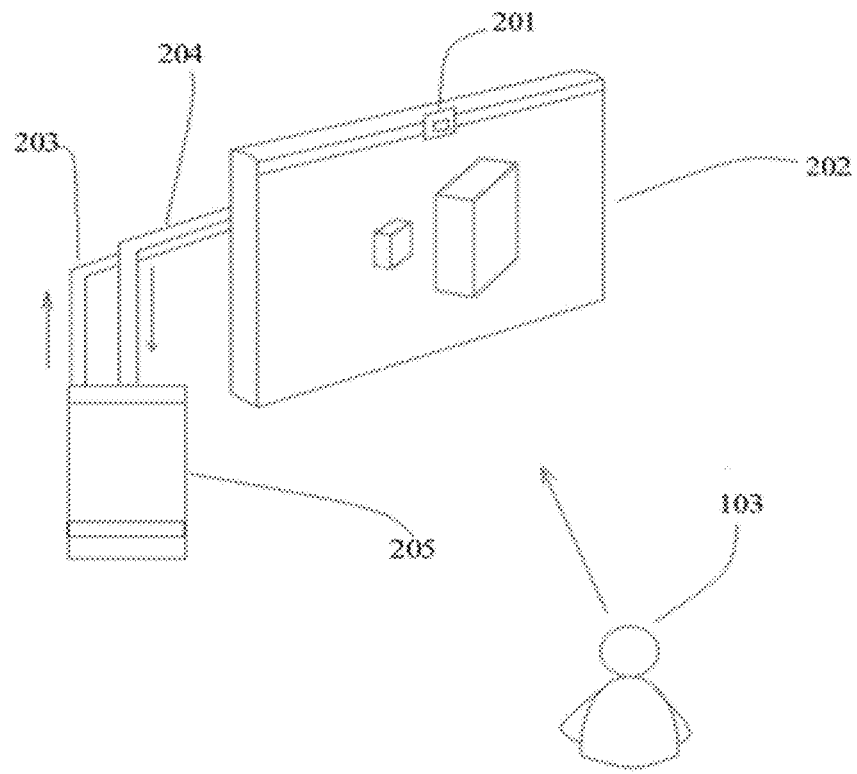

Referring to FIGS. 8A and 8B, schematic views of a three-dimensional display method shown in FIG. 6 are shown. Specifically, a stereoscopic image with movement parallax is displayed on the display panel 202 when the observer 103 moves, for example, the observer 103 can see an object originally sheltered by an edge of the display panel 202 during movement, such that the observer 103 may feel the presence of the movement parallax. Thus, sense of reality of the three-dimensional display is enhanced.

In the present disclosure, the three-dimensional display methods shown in FIGS. 3 and 6 may be combined. Specifically, after acquiring the current first image and the current second image with movement parallax with respect to the foregoing first image and the foregoing second image, the observer may be just right in the satellite three-dimensional display zone, causing an indisposed vision reaction. Then the arrangement manner of pixels of the stereoscopic image may be adjusted as mentioned based on FIG. 3, such that displaying positions of the current first image and the current second image on the display panel are exchanged with respect to the foregoing first image and the foregoing second image. Accordingly, a stereoscopic image well suitable with the current position of the observer 103 is synthesized. The sense of reality of three-dimensional displaying is enhanced and the movement related display issue is resolved as well.

Figure 9:
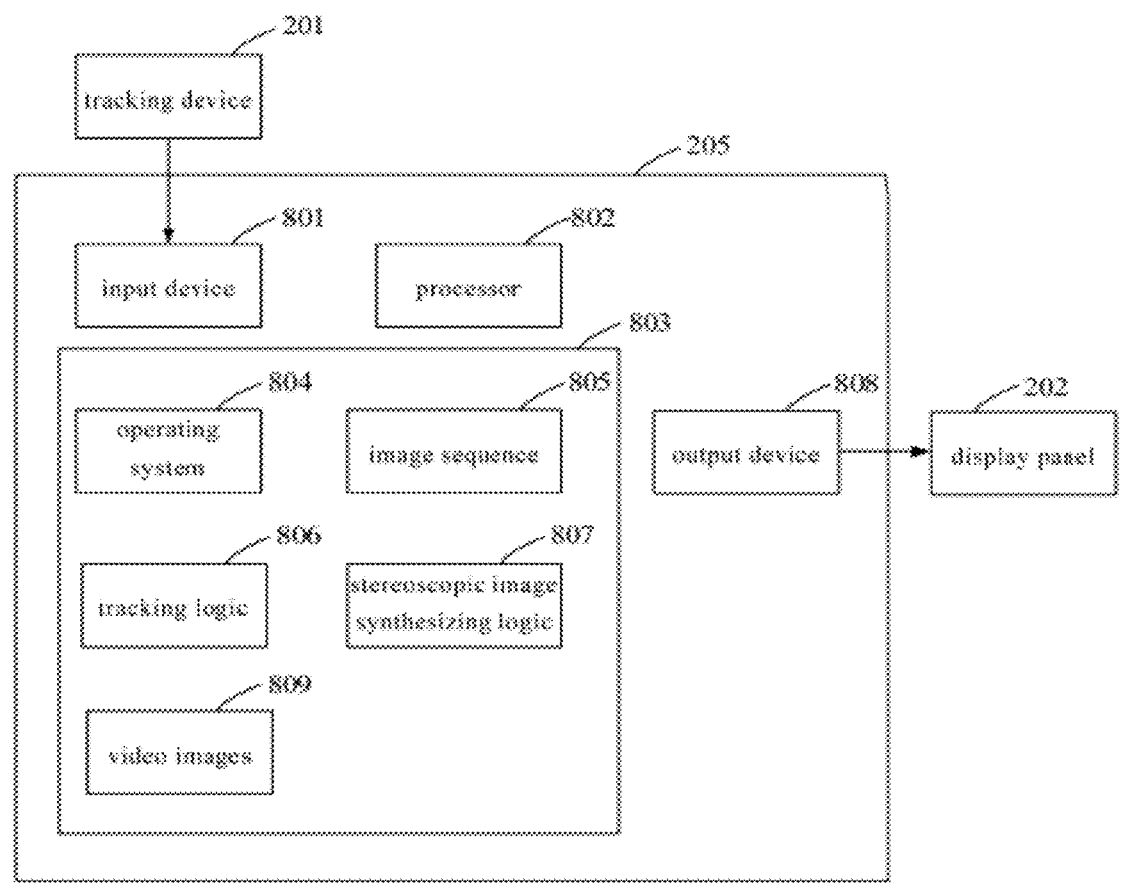
FIG. 9 is a structural schematic view of an image processing device according to a preferred embodiment of the present disclosure.

Referring to FIG. 9, a structural schematic view of an image processing device according to a preferred embodiment of the present disclosure is shown. The image processing device 205 may comprise a receive device 801, a processor 802 and a memory 803. The receive device 801 may be an input port of an ordinary electronic computer (for example, USB, serial port, DVI or LVDS) and a chip for processing port protocol and transmitting data. The receive device 801 may receive an image sequence 805 transmitted from the tracking device 201, and store the image sequence 805 in memory 803.

The memory 803 may be used for storing an operating system 804 ensuring normal working of the image processing device 205 (for example, Windows/Unix/Linux/Mac X/moving platform operating system). The action of the operating system 804 is to provide the most basic interface and function library for various algorithms and application software running in the image processing device 205. The memory 803 further comprises tracking logic 806, stereoscopic image synthesizing logic 807 and video images 809.

The processor 802 analyses and computes the image sequence 805 obtained from the tracking device 201 by performing tracking logic 806 stored in the memory 803, so as to determine the position information of the observer 103. The processor 802 synthesizes stereoscopic images using observer position information via performing stereoscopic image synthesizing logic 807 stored in the memory 803. As described above in connection with FIG. 6, the processor 802 generates the current first image with movement parallax with respect to the foregoing first image and the current second image with movement parallax with respect to the foregoing second image according to the position information, and synthesizes a stereoscopic image using the current first image and the current second image. Further, during synthesizing the stereoscopic image, the processor 802 adjusts arrangement manner of pixels of the stereoscopic image according to the position information, such that displaying positions of the current first image and the current second image of the stereoscopic image on the display panel 202 are exchanged by comparing with the foregoing first image and the foregoing second image.

Further, the image processing device 205 may include at least an output device 808. The output device 808 may be an output port of an ordinary electronic computer (for example, USB, serial port, DVI or LVDS) and a chip for processing port protocol and transmitting data. The output device 808 may be used for transmitting the stereoscopic image synthesized to the display panel 202 for displaying, so as to be enjoyed by the observer.

Notably, FIG. 9 only illustrates a basic structure of the image processing device 205, which may be extended to a high-powered electronic computer, a graphics workstation, an ordinary personal desk computer, notebook computer, or a mobile device (such as a mobile telephone or a palm gamer), or the like.

As described above, three-dimensional displaying contents may be adjusted according to the position information of the observer, so that the observer can observe three-dimensional effect uninterruptedly. Also, contents observed may be changed correspondingly according to an orientation and moving tendency of the observer, so as to achieve mutual effect between the observer and displaying contents, and enhance the sense of reality of three-dimensional displaying.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present disclosure to the full extent indicated by the broad general meaning of the terms in which the appended claims are expressed.

What is claimed is:

1. A three-dimensional (3D) display method of a 3D display system, comprising steps of:
   obtaining position information of an observer;
   identifying a displaying object of a stereoscopic image containing a foregoing first image and a foregoing second image;
   determining a relationship among a center of the displaying object, a 3D display focus of the 3D display system, and position of the observer;
   when the center of the displaying object and the position of the observer are at opposite sides of the 3D display focus of the 3D display system, generating a current first image with movement parallax with respect to the foregoing first image and a current second image with movement parallax with respect to the foregoing second image according to a deflection direction of a line drawn through the position of the observer and the 3D display focus clockwise with respect to a line drawn through the position of the observer and the center of the displaying object, so that a current object spatially presented by the current first image and the current second image deflects about the 3D display focus clockwise with respect to the displaying object; and
   adjusting the stereoscopic image using the current first image and the current second image.

2. The three-dimensional display method of claim 1, wherein the step of adjusting the stereoscopic image comprises:
   adjusting arrangement manner of pixels of the stereoscopic image according to the position information, so that displaying positions of the foregoing first image and the foregoing second image of the stereoscopic image on a display panel are exchanged.

3. The three-dimensional display method of claim 1, further including:
   when the center of the displaying object coincides with the 3D display focus of the 3D display system, generating the current first image with movement parallax with respect to the foregoing first image and the current second image with movement parallax with respect to the foregoing second image without changing any deflection direction.

4. The three-dimensional display method of claim 1, further including:
   when the center of the displaying object is located between the position of the observer and the 3D display focus of the 3D display system, generating the current first image with movement parallax with respect to the foregoing first image and the current second image with movement parallax with respect to the foregoing second image according to a deflection direction of a line drawn through the position of the observer and the 3D display focus counter-clockwise with respect to a line drawn through the position of the observer and the center of the displaying object, so that a current object spatially presented by the current first image and the current second image deflects about the 3D display focus counter-clockwise with respect to the displaying object.

5. A tracking three-dimensional display unit, comprising:
   a display panel;
   an image processing device for providing a stereoscopic image containing a foregoing first image and a foregoing second image to the display panel; and
   a tracking device for obtaining an image sequence of an observer;
   wherein the image processing device determines position information of the observer according to the image sequence,
   identifies a displaying object of the stereoscopic image;
   determines a relationship among a center of the displaying object, a 3D display focus of the display panel, and position of the observer;
   when the center of the displaying object and the position of the observer are at opposite sides of the 3D display focus, generates a current first image with movement parallax with respect to the foregoing first image and a current second image with movement parallax with respect to the foregoing second image according to a deflection direction of a line drawn through the position of the observer and the 3D display focus clockwise with respect to a line drawn through the position of the observer and the center of the displaying object, so that a current object spatially presented by the current first image and the current second image deflects about the 3D display focus clockwise with respect to the displaying object; and adjusts the stereoscopic image using the current first image and the current second image.

6. The tracking three-dimensional display unit of claim 5, wherein the image processing device adjusts arrangement manner of pixels of the stereoscopic image according to the position information, so that displaying positions of the foregoing first image and the foregoing second image of the stereoscopic image on the display panel are exchanged.

7. The tracking three-dimensional display unit of claim 5, wherein, when the center of the displaying object coincides with the 3D display focus, the image processing device generates the current first image with movement parallax with respect to the foregoing first image and the current second image with movement parallax with respect to the foregoing second image without changing any deflection direction.

8. The tracking three-dimensional display unit of claim 7, wherein, when the center of the displaying object coincides with the 3D display focus, the image processing device generates the current first image with movement parallax with respect to the foregoing first image and the current second image with movement parallax with respect to the foregoing second image without changing any deflection direction.

9. The tracking three-dimensional display unit of claim 8, wherein when the center of the displaying object is located between the position of the observer and the 3D display focus, the image processing device generates the current first image with movement parallax with respect to the foregoing first image and the current second image with movement parallax with respect to the foregoing second image according to a deflection direction of a line drawn through the position of the observer and the 3D display focus counter-clockwise with respect to a line drawn through the position of the observer and the center of the displaying object, so that a current object spatially presented by the current first image and the current second image deflects about the 3D display focus counter-clockwise with respect to the displaying object.

10. The tracking three-dimensional display unit of claim 9, wherein the image processing device further adjusts arrangement manner of pixels of the stereoscopic image according to the position information, so that displaying positions of the current first image and the current second image of the stereoscopic image on the display panel are exchanged compared with the foregoing first image and the foregoing second image.

11. An image processing device, comprising:
   a memory for storing tracking logic and stereoscopic image synthesizing logic; and
   a processor for running the tracking logic and determining position information of an observer according to the image sequence,
   identifying a displaying object of a stereoscopic image containing a foregoing first image and a foregoing second image;
   determining a relationship among a center of the displaying object, a 3D display focus of the image processing device, and position of the observer;
   when the center of the displaying object and the position of the observer are at opposite sides of the 3D display focus, generating a current first image with movement parallax with respect to the foregoing first image and a current second image with movement parallax with respect to the foregoing second image according to a deflection direction of a line drawn through the position of the observer and the 3D display focus clockwise with respect to a line drawn through the position of the observer and the center of the displaying object, so that a current object spatially presented by the current first image and the current second image deflects about the 3D display focus clockwise with respect to the displaying object; and
   running the stereoscopic image synthesizing logic so as to adjust the stereoscopic image using the current first image and the current second image.

12. The image processing device of claim 11, wherein, when the center of the displaying object coincides with the 3D display focus, the processor generates the current first image with movement parallax with respect to the foregoing first image and the current second image with movement parallax with respect to the foregoing second image without changing any deflection direction.

13. The image processing device of claim 12, wherein, when the center of the displaying object is located between the position of the observer and the 3D display focus, the processor generates the current first image with movement parallax with respect to the foregoing first image and the current second image with movement parallax with respect to the foregoing second image according to a deflection direction of a line drawn through the position of the observer and the 3D display focus counter-clockwise with respect to a line drawn through the position of the observer and the center of the displaying object, so that a current object spatially presented by the current first image and the current second image deflects about the 3D display focus counter-clockwise with respect to the displaying object.

14. The image processing device of claim 11, wherein the processor further adjusts arrangement manner of pixels of the stereoscopic image according to the position information, so that displaying positions of the current first image and the current second image of the stereoscopic image on a display panel are exchanged compared with the foregoing first image and the foregoing second image.

* * * * *